United States Patent [19]

Kanesaka

[11] Patent Number: 4,802,452
[45] Date of Patent: Feb. 7, 1989

[54] ENGINE INTAKE SYSTEM
[75] Inventor: Hiroshi Kanesaka, Kawasaki, Japan
[73] Assignees: Usui Kokusai Sangyo Kabushiki Kaisha, Shizuoka; Kabushiki Kaisha Kanesaka Gijutsu Kenkyusho, Kawasaki, both of Japan
[21] Appl. No.: 901,764
[22] Filed: Aug. 28, 1986
[30] Foreign Application Priority Data
  Sep. 6, 1985 [JP] Japan .............................. 60-195941
[51] Int. Cl.$^4$ ............................................. F02D 31/00
[52] U.S. Cl. ...................................... 123/376; 123/316
[58] Field of Search ................. 123/90.17, 90.18, 347, 123/376, 52 MB, 316, 52 MF
[56] References Cited

U.S. PATENT DOCUMENTS

| | | | |
|---|---|---|---|
| 2,533,180 | 12/1950 | Rhodes | 123/376 |
| 2,534,346 | 12/1950 | Fenney | 123/376 |
| 2,628,470 | 2/1953 | Orton | 123/376 |
| 2,841,129 | 7/1958 | Reggio | 123/376 |
| 2,972,390 | 2/1961 | Bunker et al. | 123/376 |
| 3,422,802 | 1/1969 | Kamp | 123/347 |
| 4,232,641 | 11/1980 | Curtil | 123/76 |
| 4,494,496 | 1/1985 | Nakamura et al. | 123/90.17 |
| 4,535,731 | 8/1985 | Banfi | 123/90.17 |

FOREIGN PATENT DOCUMENTS 262070  4/1950  Fed. Rep. of Germany ...... 123/316

Primary Examiner—Charles J. Myhre
Assistant Examiner—David A. Okonsky
Attorney, Agent, or Firm—Anthony J. Casella; Gerald E. Hespos

[57] ABSTRACT

An intake system for an internal combustion engine comprises: an intake passage having an intake port and an inertial supercharging intake pipe leading from the passage; a rotary valve in the intake pipe and rotatable for opening and closing the intake pipe; and timing adjusting means for changing the opening timing of the rotary valve in accordance with engine speed.

8 Claims, 3 Drawing Sheets

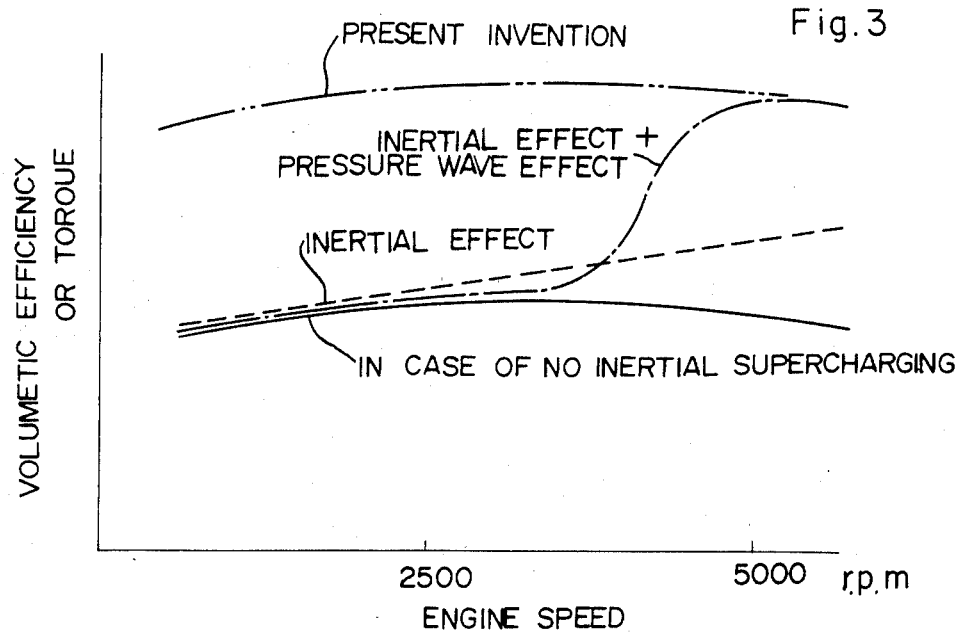
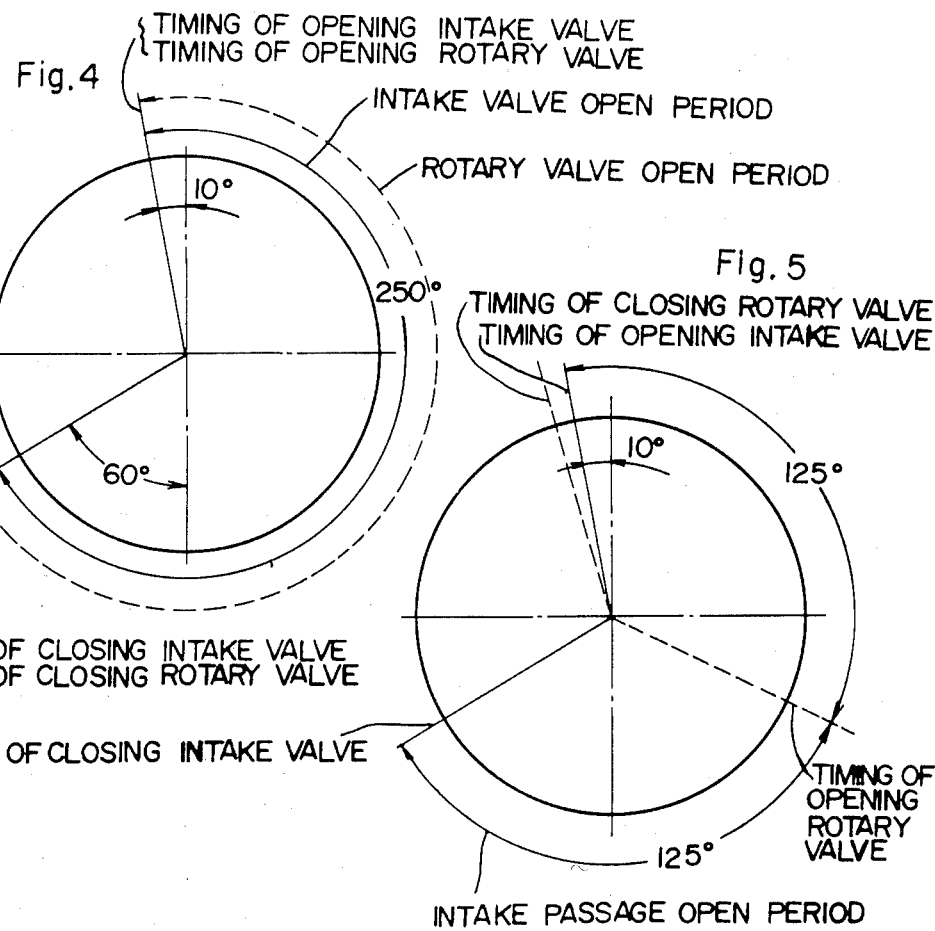

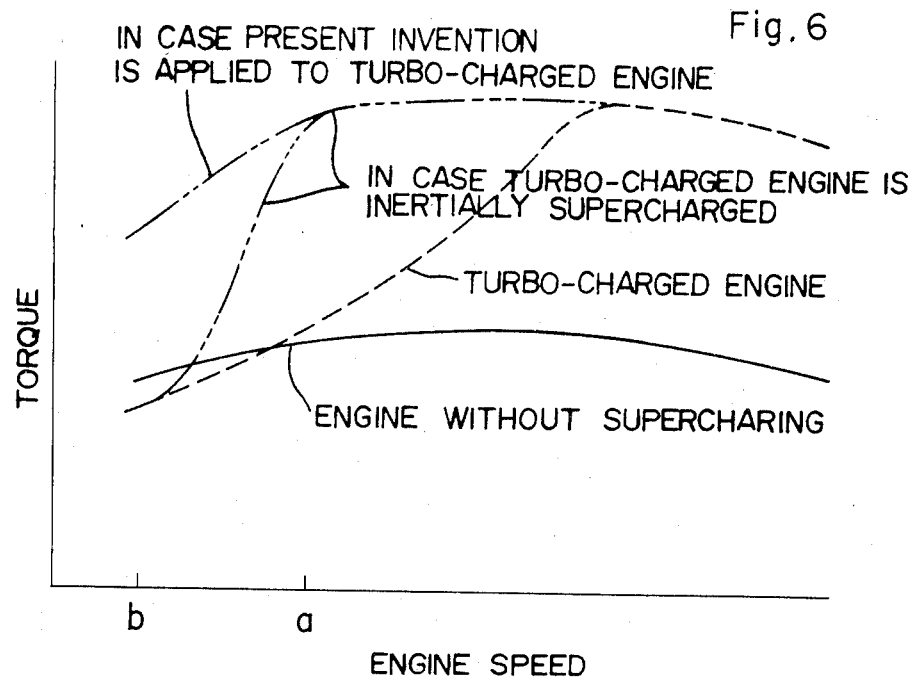
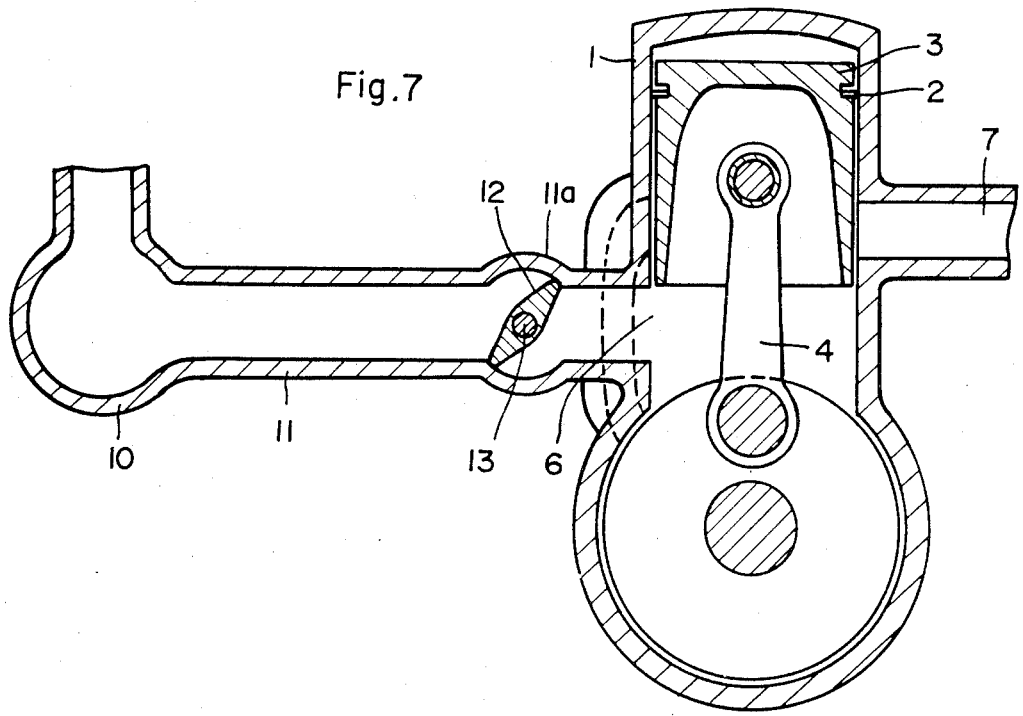

ENGINE INTAKE SYSTEM

BACKGROUND OF THE INVENTION

1. Field of the Invention

This invention relates to an intake system for an internal combustion engine and more particularly to an engine intake system making use of inertial supercharging.

2. Description of the Prior Arts

A well-known intake system making use of inertial supercharging is a supercharging system for enhancing volumetric efficiency, by using both the inertial effect of air flowing through an intake passage immediately before the end of a suction stroke and the pressure wave effect obtained by synchronizing the introduction of pressure waves in the intake passage into an engine cylinder and the closing timing of an intake valve; this is an effective means for augmenting an average effective pressure of an engine.

In order to attain the inertial effect, however, a predetermined or higher engine r.p.m. is required, depending upon the length of the intake passage. At low engine speed therefore, the flow velocity of the air in the intake pipe is so low that the inertial effect also is low, and ineffective. In order to attain the pressure wave effect, on the other hand, the arrival timing of the pressure waves having a propagating sound velocity at the engine cylinder and the closing timing of the intake valve have to be synchronized at a specified engine speed. At an engine speed other than the specified one, negative pressure waves become timed with the closing of the intake valve so that the pressure wave effect generally becomes negative and troublesome.

Thus, generally speaking an automotive engine makes use of the pressure wave effect at high speed, when the inertial effect is high, with a view to augmenting its output. This in turn means that low-speed torque necessary for starting the engine cannot be increased.

In either a petrol or a diesel engine, on the other hand, vortexes of the air in the cylinder are desirable for improving combustion efficiency and for removing the exhaust gas. In a known intake system, the intake passage of the engine is shaped to establish intense vortexes only at a specified engine speed. As a result, the vortexes are intense at a higher engine speed but mild at a lower engine speed, so that vortexes of the required intensity are generated only at an engine speed within a specified, narrow range. Thus combustion will be less effective if that specified range is not covered.

On the other hand, a turbo-charged engine has low supercharging capacity at low speed because of characteristics of the turbo-charger, which is ineffective at a high supercharging pressure so that it cannot generate good low-speed torque. Therefore some turbo-charged engines are designed to use the aforementioned pressure wave effect as to increase torque within a narrow range at low speed. Outside that speed range, however, the pressure wave effect exerts an adverse effect, with the disadvantage that it cannot enhance a low-speed torque, i.e. the torque required for starting the vehicle.

SUMMARY OF THF INVENTION

It is thus an object of this invention to provide an intake system for an internal combustion engine, which can have a constant intensity of vortexes in the cylinders, which has good combustion. Also it can have a high average effective pressure by not limiting the engine r.p.m., which is effective for the inertial supercharging effect in the engine intake system, to a predetermined value but at all times making the speed of the air flowing in the intake passage at the suction stroke of the engine substantially constant, even if the engine speed changes (especially to a low range), so that a uniform intertial supercharging effect may be attained over substantially all the engine speed range.

According to this invention, there is provided an intake system for an internal combustion engine, the system comprising: an intake passage having an intake port and an inertial supercharging intake pipe leading from the intake port; a rotary valve disposed in the intake passage and rotatable for opening and closing the intake passage; and timing adjusting means for changing the opening timing of the rotary valve in accordance with engine speed.

At about three quarters of maximum engine speed more specifically, the opening and closing timings are synchronized with those of an intake valve, and the opening timing of the rotary valve is retarded by the timing adjusting means, when the engine speed drops, so that suction is started with the retarded opening timing of the rotary valve and is ended with the closure of the intake valve, whereby the inertial effect and the pressure wave effect of the intake air by the inertial supercharging intake pipe may be effectively used.

BRIEF DESCRIPTION OF THE DRAWINGS

FIG. 3 is a diagram illustrating the volumetric efficiencies (or torques) of engines with and without the system of the invention;

FIG. 4 is a diagram illustrating the opening and closing timings of the rotary and intake valves of the system when the engine is running at high speed;

FIG. 5 is a diagram illustrating the opening and closing timings of the rotary and intake valves of the system when the engine is running at low speed;

FIG. 6 is a diagram illustrating the engine torques of turbo-charged engines with and without the system of the invention; and FIG. 7 is a schematic, longitudinal section showing a 2-cycle engine having an intake system in accordance with the invention.

DETAILED DESCRIPTION OF THE INVENTION

Figure 1:
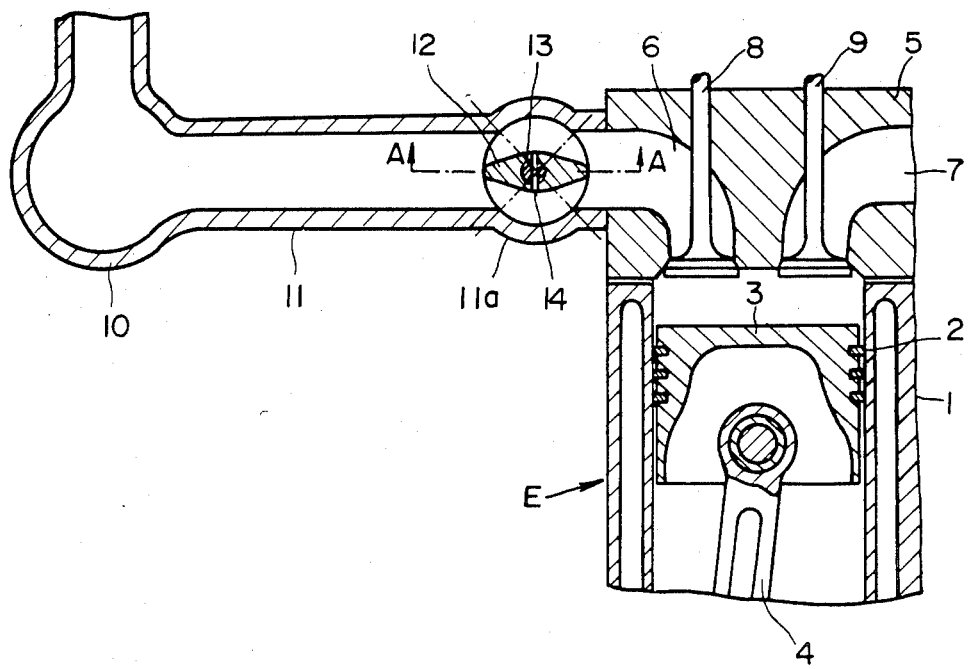
FIG. 1 is a schematic longitudinal section of a 4-cycle engine with an intake system in accordance with the invention.

Referring to the drawings, an intake system is constructed in general as shown in FIG. 1. A 4-cycle engine E has a cylinder head 5 mounted on a cylinder 1. In this cylinder 1 is a reciprocating piston 3 which carries a piston ring 2 to rotate a crankshaft (not shown) through a connecting rod 4. The head 5 has an intake port 6 and an exhaust port 7 which have an intake valve 8 and an exhaust valve 9 respectively. Upstream of the intake port 6 in an inertial supercharging long intake pipe 11 connecting the intake port 6 and an intake chamber 10, there is arranged a rotary valve 12 which is driven from the crankshaft through a gear transmission, to operate as a control valve.

Figure 2:
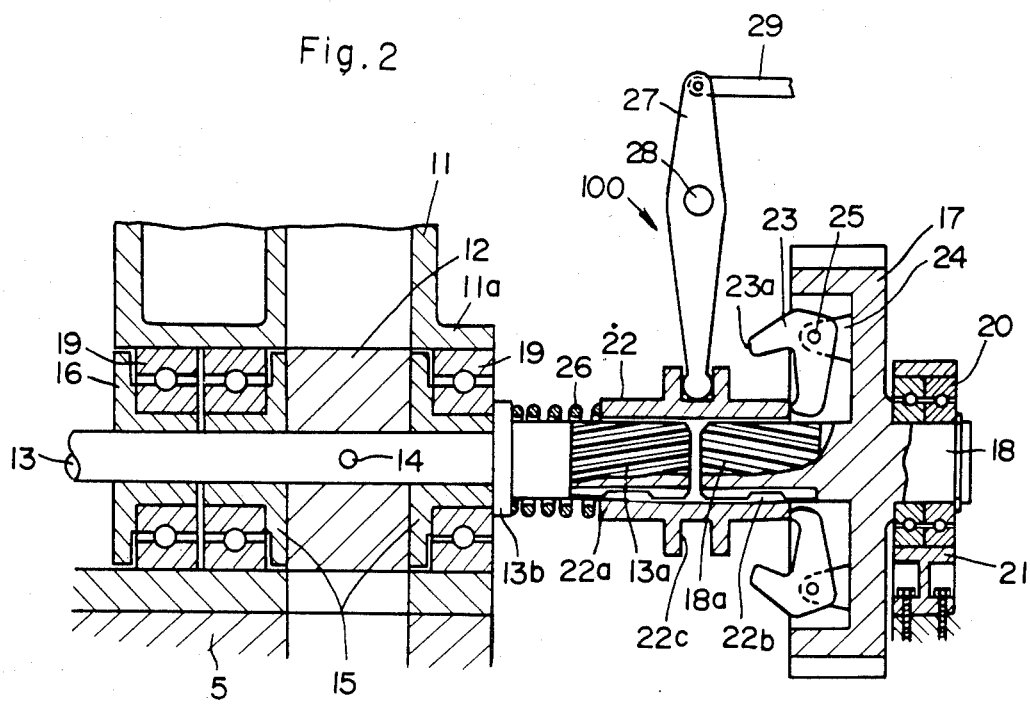
FIG. 2 is a section on plane A—A of FIG. 1 and also shows timing adjusting means for adjusting the opening and closing timings of a rotary valve in the system.

FIG. 2 shows the timing adjusting means including the drive to the rotary valve 12. This valve 12 is fixed by a pin 14 on a drive shaft 13 supported by a valve body 11a formed midway of the intake pipe 11. The drive shaft 13 is mounted by a plurality of bearings 19 and a pair of sleeves 15 which are arranged to clamp the rotary valve 12 in the valve body 11a, and also by a single sleeve 16. The drive shaft 13 has one end formed with a counter-clockwise helical spline 13a.

A timing gear 17 is connected in driven relationship with the crankshaft (not shown) by a gear mechanism. A rotary shaft 18 is integrated with the timing gear 17 and is supported at its right hand end by a bearing 20 and a bracket 21 attached to the engine. The left hand end of the shaft 18 has a clockwise helical spline 18a. These counter-clockwise and clockwise helical splines 13a and 18a are connected by an adjusting member 22 which is formed on its inner face with teeth 22a and 22b meshing with the two splines 13a and 18a, respectively.

A centrifugal weight 23 is swingably supported by a pin 25 on a bracket 24 projecting from the inner side of the timing gear 17. The weight 23 has one end abutting the right hand end of the adjusting member 22.

A compression coil spring 26 is mounted between a flange 13b of the drive shaft 13 and the left hand end of the adjusting member 22 for urging the latter against the centrifugal weight 23 at all times. Thus the weight 23 cannot overcome the force of the spring 26 at a predetermined or lower speed of the engine but at a higher speed can move the adjusting member 22 to the left. As a result, a phase difference is established between the rotary shaft 18 and the drive shaft 13 by the helical splines 13a and 18a meshing with the teeth 22a and 22b. In other words, the drive shaft 13 is turned in a direction such as to retard the opening timing of the rotary valve 12. As a result, it is possible to retard the suction starting timing of the engine and to shorten the suction period.

An adjusting lever 27 is mounted on a pin 28. The lever 27 has its lower end engaging in a groove 22c of the adjusting member 22 and its upper end connected to a fuel flow rate adjusting device (not shown) by a link 29.

In the embodiment shown in FIG. 1, incidentally, the rotary valve 12 has its valve opening and closing periods set at about every 90 degrees and is driven at one half the speed of the crankshaft by the timing gear 17. If however the rotary valve 12 is driven at a quarter of the speed of the crankshaft, the valve opening periods may be set at about 45 degrees.

The adjusting means, as generally denoted by numeral 100, which is used in the intake system of the invention for adjusting the opening and closing timings of the rotary valve, need not have its construction limited to the combination of the centrifugal weight, the spring, the lever and the adjusting member engaging with the helical splines for axial movements. The operation of the intake system of the invention is not affected if the adjusting means 100 is constructed to adjust the opening timing of the rotary valve in accordance with engine speed or load, for example.

Operation of the embodiment described above will now be discussed.

FIG. 3 illustrates the relation between engine speed, volumetric efficiency and torque. In FIG. 3 the solid curve indicates the case of no inertial supercharging; the dashed curve indicates the inertial effect if an inertial supercharging intake pipe used is long; the single dot-dash curve indicates the case of inertial supercharging in which the pressure wave effect is added to the inertial effect; and the double-dot-dash curve indicates use of the system of the invention.

In a well-known engine having a maximum speed of 6,000 r.p.m., for example, the length of the intake pipe is set to establish the maximum pressure wave effect at 5,000 r.p.m. so that engine output may be augmented. At low speed, however, high torque cannot be obtained, as has been discussed above. If the system of the invention is applied to this engine, the centrifugal weight 23 has a high centrifugal force at the high speed of 5,000 r.p.m., so that its inward projection 23a pushes the adjusting member 22 against the compression spring 26 and so that the phase of the rotary valve 12 is so advanced with respect to the timing gear 17 (as shown in FIG. 4) as to synchronize the timings of the openings of the intake valve and the rotary valve. In the FIG. 4 state, an engine having the intake system of the invention has its intake passage opening and closing timings made substantially the same as those of the ordinary engine by the action of the rotary valve, and is subjected to the inertial supercharging due to the inertial and pressure wave effects similar to those of the ordinary inertial supercharging engine shown in FIG. 3, so that it can generate a similarly large torque.

At a low engine speed, the ordinary engine has its intake passage open period so elongated that the pressure waves flowing at a constant sound velocity into the cylinder are reflected, if the intake valve is closed, to return as back pressure waves in the intake passage. As a result, not only the pressure wave effect turns negative but the piston speed is so low that the corresponding gas flow speed in the intake passage drops, to degrade the inertial effect, as shown in FIG. 3.

In the system of the invention, the centrifugal force of the weight 23 falls so as not to overcome the force of the spring 26 as the engine speed drops, so that the adjusting member 22 is pushed to the right to retard the phase of the shaft 13, and accordingly the phase of the rotary valve on the shaft 13, with respect to that of the timing gear 17. As a result, the open time period of the intake passage, which is to be opened when the rotary valve 12 is opened and closed when the intake valve 8 is closed, is equalized with that of the high engine speed, so that the pressure wave effect similar to the high engine speed occurs and also so that the gas flow speed in the intake passage in the suction stroke is held at the same level as at high engine speed so as to provide an inertial effect similar to that of the high engine speed, as indicated by a double-dash-dotted curve in FIG. 3.

These operations will be described in more detail with reference to FIGS. 3, 4 and 5. If the engine having its intake passage and valve timings set to exhibit the highest effects at 5,000 r.p.m. for example, is run at half speed or 2,500 r.p.m. for example, the timing of opening the rotary valve is retarded, as shown in FIG. 5, such that the intake valve open period, i.e. the intake passage open period of 250 degrees is reduced to one half, i.e. 125 degrees. Then the intake passage open period is identical to that of the engine speed of 5,000 r.p.m., so that the internal supercharging effect obtainable is similar to that of the engine speed of 5,000 r.p.m., as has been described.

With the engine speed changing, moreover, the flow speed of the gases flowing into the cylinder is constant. This also makes constant the intensity of the vortexes generated in the cylinder so that the gases can be burned at high efficiency over the whole speed range while emitting a "clean" exhaust.

Now operation will be described as applied to the case in which the system of the invention is applied to a turbo-charged engine. The solid curve in FIG. 6 indicates the relation between r.p.m. and torque of an unsupercharged engine. Generally speaking, the turbo-charged engine has its torque augmented with engine speed, as indicated by the dashed curve in FIG. 6. If this engine has a high allowable combustion pressure, therefore, the torque will increase along the dashed curve but will fail to generate the low-speed torque necessary for a vehicular engine.

Even if the inertial supercharging device is set at the engine r.p.m. a in FIG. 6, with a view to improving low-speed torque, on the other hand this low-speed torque is augmented as along a triple-dash-dotted curve, as is well known. At an engine r.p.m. b in FIG. 6, however, a very low-speed torque is not changed and fails to generate the starting torque necessary for the engine. If the rotary valve for adjusting the valve opening and closing timings is added to the intake passage of the turbo-charged engine having inertial supercharging and has its opening timing adjusted, as has been described, the very low-speed torque (i.e. the torque at the engine r.p.m. b in FIG. 6) can be increased, as indicated by the double-dash-dotted curve.

Operation of a spark ignition engine, to which the system of the invention is applied, will now be described with the engine partially loaded. Inorder that the rotary valve 12 in the intake passage, having no throttle means such as a throttle valve, may be opened in the vicinity of the bottom dead point of the suction stroke, the line 29 (FIG. 2) of the fuel supply rate adjusting device (not shown) is pulled to the right to turn the adjusting lever 27 clockwise on the pin 28 so that the adjusting member 22 is moved further to the left to retard the opening timing of the rotary valve 12. Then the air-fuel mixture can be sucked at sound velocity into the cylinder under high vacuum so that highly intense vortexes can be generated in the cylinder by that mixture in a very short time period for burning of the mixture, even if the mixture is lead. In idling, for example, the intake port open period is shortened to as little as about 5 degrees, so that the fuel supply rate adjusting device elongates the intake port open period with the increase in the load.

FIG. 7 shows the case in which the system of the invention is applied to a 2-stroke cycle engine. In this case, the rotary valve 12 also has its open period adjusted by timing adjusting means similar to that shown in FIG. 2 to adjust the intake port open period, as has been described, so that the inertial supercharging effect can also be attained even at low engine speed, as in the 4-stroke cycle engine.

As so far described, the rotary valve for adjusting the valve opening and closing timings is disposed in the intake passage and has its valve opening timing changed with the engine speed by the adjusting means. As a result, the time period for which the intake passage is open is made constant for all engine loads and over substantially the whole of the engine speed range, to retain the pressure waves in the cylinder without fail and to establish the inertial effect not only at a high speed but at a low engine speed so that a high volumetric efficiency can be attained over the whole speed range. Also the intensity of the vortexes in the cylinder is made constant, independently of the engine speed, to effect "clean" combustion and at high efficiency so that high torque can be generated over the whole speed range.

Also, the flow rate of the mixture is not adjusted by the throttle valve when the spark-ignition engine is under its partial load, but the open period of the intake passage is shortened by retarding the open timing of the rotary valve 12, so that the mixture is introduced at sound velocity into the cylinder. As a result, the intensity of the vortexes is increased to give lean combustion under partial load, so that the engine can have high heat efficiency with low exhaust pollution.

While the present invention has been described with reference to particular embodiments thereof, it will be understood that numerous modifications may be made by those skilled in the art without actually departing from the spirit and scope of the invention as defined in the appended claims.

I claim:

1. An intake system for an internal combustion engine, the system comprising: an intake passage having an intake port and an inertial supercharging intake pipe leading to the intake port; an intake valve mounted in said intake port and operatively connected to said engine for alternately opening and closing the intake port; a rotary valve operatively connected to the engine and disposed in the intake passage intermediate said inertial supercharging intake pipe and said intake port, said rotary valve being rotatable for opening and closing the intake passage, and timing adjusting means operatively connected to said engine and to said rotary valve for retarding the opening of the rotary valve relative to the opening of the intake valve at low engine speeds, and for advancing the opening of the rotary valve at high engine speeds, whereby the retarding and advancing of the opening of the rotary valve enables inertial supercharging in the intake pipe at both low and high engine speeds.

2. A system according to claim 1, wherein, at substantially three quarters of the maximum engine speed, opening and closing timings are synchronized with those of an intake valve, and wherein the opening timing of the rotary valve is retarded by the timing adjusting means when the engine speed drops, so that the suction starts with the retarded opening timing of the rotary valve and ends with the closure of the intake valve, whereby the inertial effect and the pressure wave effect of the intake air by the intake pipe can be used.

3. A system according to claim 1 wherein the timing adjusting means includes a first driven shaft on which the rotary valve is mounted; a second driving shaft; and an adjustable connection between the first and second shafts.

4. A system according to claim 3 wherein the first and second shafts are disposed end to end on a common axis.

5. A system according to claim 4 wherein the first shaft has a helical spline of one hand, the second shaft has a helical spline of opposite hand, and an internally threaded sleeve engages both splines and is co-axial with them.

6. A system according to claim 5 wherein the sleeve is movable by adjusting means in accordance with engine speed.

7. A system according to claim 6 wherein the adjusting means is a centrifugal weight in a rotatable mounting, and a compression coil spring which urges the sleeve towards the weight, such that above a given engine speed the centrifugal weight overcomes the force of the spring and moves the sleeve to adjust the driven shaft and the rotary valve.

8. A system according claim 5, wherein the sleeve is additionally adjustably movable by a fuel flow rate adjusting device.

* * * * *